(12) United States Patent
Nakamura (10) Patent No.: US 12,177,402 B2
(45) Date of Patent: Dec. 24, 2024

(54) IMAGE READING APPARATUS AND IMAGE FORMING APPARATUS

(71) Applicant: CANON KABUSHIKI KAISHA, Tokyo (JP)

(72) Inventor: Takatsugu Nakamura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 197 days.

(21) Appl. No.: 18/069,515

(22) Filed: Dec. 21, 2022

(65) Prior Publication Data

US 2023/0224418 A1   Jul. 13, 2023

(30) Foreign Application Priority Data

Jan. 12, 2022 (JP) .................... 2022-002915

(51) Int. Cl.
  *H04N 1/04* (2006.01)
  *H04N 1/028* (2006.01)

(52) U.S. Cl.
  CPC .................. *H04N 1/02855* (2013.01)

(58) Field of Classification Search
  USPC .................. 358/484, 475, 509, 474
  See application file for complete search history.

(56) References Cited

U.S. PATENT DOCUMENTS

| | | | | |
|---|---|---|---|---|
| 7,760,403 B2* | 7/2010 | Sakurai | .............. | G02B 6/0068 358/475 |
| 8,755,092 B2* | 6/2014 | Okamoto | .......... | H04N 1/02855 399/144 |
| 9,253,358 B2* | 2/2016 | Murakami | ......... | H04N 1/02855 |
| 2006/0008295 A1* | 1/2006 | Kohchi | .............. | H04N 1/02885 399/144 |
| 2010/0129116 A1* | 5/2010 | Shinkawa | ............ | H04N 1/1026 362/613 |
| 2010/0232834 A1* | 9/2010 | Ishida | ................ | H04N 1/02865 399/144 |
| 2013/0321879 A1* | 12/2013 | Takahashi | .......... | H04N 1/02855 362/621 |
| 2014/0055827 A1* | 2/2014 | Mitsutake | .......... | H04N 1/02865 358/475 |
| 2018/0109695 A1 | 4/2018 | Takahashi | | |
| 2019/0268495 A1* | 8/2019 | Otake | .................. | G03G 15/043 |

* cited by examiner

Primary Examiner — Cheukfan Lee
(74) Attorney, Agent, or Firm — ROSSI, KIMMS & McDOWELL LLP (57) ABSTRACT

An image reading apparatus includes a circuit board on which a plurality of light sources are disposed in a longitudinal direction, a light guide portion including a first holding portion configured to hold the circuit board, and a second holding portion configured to hold the circuit board, a support member configured to support the light guide portion, and an image reading unit configured to read image information by performing photoelectric conversion on reflected light reflected by a sheet which has received light emitted from the light guide portion. The support member includes a projecting portion disposed between the first holding portion and the second holding portion in the longitudinal direction, the projecting portion facing and projecting toward the circuit board held by the first holding portion and the second holding portion.

12 Claims, 10 Drawing Sheets

IMAGE READING APPARATUS AND IMAGE FORMING APPARATUS

BACKGROUND OF THE INVENTION

Field of the Invention

This disclosure relates to an image reading apparatus reading an image of a sheet, and an image forming apparatus including the image reading apparatus.

Description of the Related Art

In general, image forming apparatuses such as copying machines and facsimiles include an image reading apparatus for optically reading an image of a document. A known image reading apparatus includes an illumination unit in which a plurality of light emitting diodes (LEDs) (point source) are lineally disposed to illuminate documents. For example, US2018/0109695A1 has proposed an illumination unit in which a light guide guides light emitted from the plurality of LEDs disposed on an LED board to the document. This light guide guides the light, which is emitted from the plurality of LEDs and diffused in a circular shape, toward a document surface along a main scanning direction (LED arrangement direction) in document reading.

Incidentally, a deformation such as a waviness and a bend sometimes occurs in the preparation of the LED board. When the deformed LED board is used in the illumination unit described in US2018/0109695A1, an exit surface of the LED deviates from an entrance surface of the light guide, so that a light amount for illuminating the document does not become uniform in the LED arrangement direction (main scanning direction). Consequently, there is the fear that the illumination unit may not be able to provide a high quality read image having color stability.

SUMMARY OF THE INVENTION

According to an aspect of the present invention, an image reading apparatus includes a circuit board on which a plurality of light sources are disposed in a longitudinal direction, a light guide portion configured to guide light emitted from the plurality of light sources, the light guide portion including a first holding portion configured to hold the circuit board, and a second holding portion configured to hold the circuit board, the second holding portion being disposed at a position different from the first holding portion in the longitudinal direction, a support member configured to support the light guide portion, and an image reading unit configured to read image information by performing photoelectric conversion on reflected light reflected by a sheet which has received light emitted from the light guide portion. The support member includes a projecting portion disposed between the first holding portion and the second holding portion in the longitudinal direction, the projecting portion facing and projecting toward the circuit board held by the first holding portion and the second holding portion.

Further features of the present invention will become apparent from the following description of exemplary embodiments with reference to the attached drawings.

DESCRIPTION OF THE EMBODIMENTS

Hereinafter, an image reading apparatus and an image forming apparatus of this disclosure will be described with reference to the accompanying drawings. The scope of this technique, however, is not intended to be limited to the size, material, shape, and relative arrangement of components described in the following embodiments, unless otherwise specifically stated.

Schematic Configuration of Printer

Figure 1:
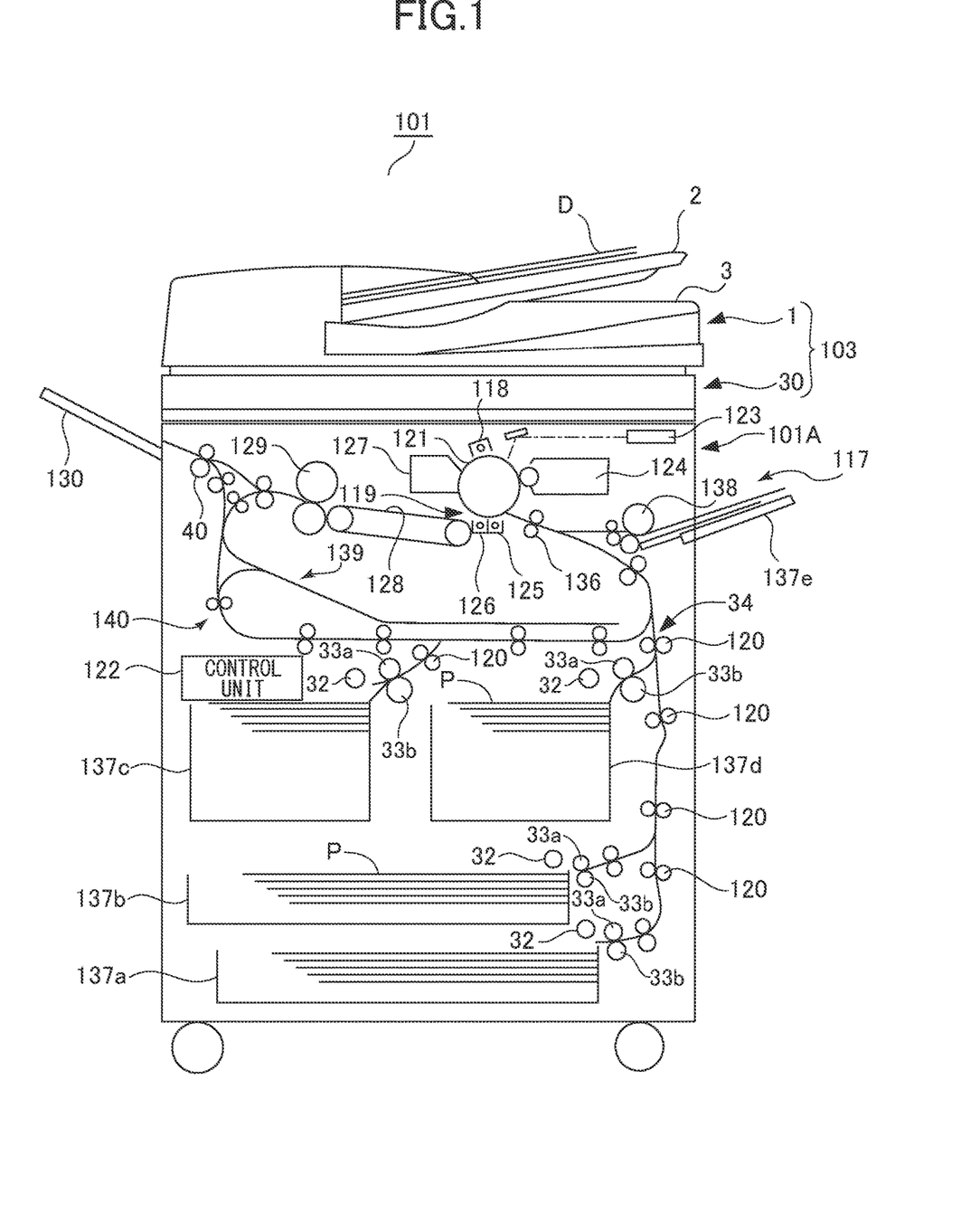
FIG. 1 is an overall schematic diagram of a printer of this embodiment.

First, a schematic configuration of a printer 101, serving as an image forming apparatus, will be described with reference to FIG. 1. As illustrated in FIG. 1, the printer 101 includes a printer body 101A and an image reading apparatus 103. The image reading apparatus 103, which is disposed on the printer body 101A, includes a reading unit 30, described in detail below, and an automatic document feeder (ADF) 1, and reads image information by optically scanning a document D. The document D is a sheet, such as a sheet of paper, an envelope, a plastic film such as an overhead transparency (OHT), or a cloth sheet. The image information which is converted into an electrical signal by the image reading apparatus 103 is sent to a control unit 122 disposed in the printer body 101A. To be noted, in this embodiment, a front face side, on which a user stands facing toward an operation panel, not shown, for operating the printer 101, of the apparatus is defined as a front direction, and a back face side of the apparatus is defined as a back direction.

The printer body 101A includes an image forming unit 119 which forms an image on a sheet P used as a record medium, a sheet feeding unit 34 which feeds the sheet P to the image forming unit 119, and a manual sheet feed portion 117. The sheet feeding unit 34 includes sheet storing portions 137a, 137b, 137c, and 137d which are capable of storing sheets having sizes different to each other. The sheet P stored in each of the sheet storing portions is fed by a pickup roller 32, separated one by one by a feed roller 33a and a retard roller 33b, and received by a corresponding conveyance roller pair 120. The sheet P is then sequentially received by a plurality of conveyance roller pairs 120 disposed along a sheet conveyance path, and then conveyed to a registration roller pair 136.

To be noted, the sheet P placed on a manual feed tray 137e of the manual sheet feed portion 117 by the user is fed to the interior of the printer body 101A by a feed roller 138, and conveyed to the registration roller pair 136. The registration roller pair 136 stops the leading edge of the sheet P and corrects the skew of the sheet P, and starts to convey the sheet P again in synchronization with the image formation, which is a toner image forming process performed by the image forming unit 119.

The image forming unit 119, which forms an image on the sheet P, is an electrophotographic unit including a photosensitive drum 121, serving as a photosensitive member. The photosensitive drum 121 is capable of rotating along a direction in which the sheet P is conveyed, and a charger 118, an exposing unit 123, a developing unit 124, a transfer charger 125, a separation charger 126, and a cleaner 127 are disposed around the photosensitive drum 121. The charger 118 uniformly charges a surface of the photosensitive drum 121. The exposing unit 123 exposes the photosensitive drum 121 in accordance with image information input from the image reading apparatus 103 and the like, and forms an electrostatic latent image on the photosensitive drum 121.

The developing unit 124 stores two-component developer which contains toner and carrier, and develops the electrostatic latent image into a toner image by supplying electrically charged toner onto the photosensitive drum 121. The toner image carried by the photosensitive drum 121 is transferred onto the sheet P conveyed from the registration roller pair 136 by a bias electric field generated by the transfer charger 125. The sheet P onto which the toner image has been transferred is separated from the photosensitive drum 121 by a bias electric field generated by the separation charger 126, and conveyed toward a fixing unit 129 by a pre-fixing conveyance unit 128. To be noted, the cleaner 127 collects a sticking substance such as remaining toner, which has not been transferred onto the sheet P and left on the photosensitive drum 121, for the next image forming operation by the photosensitive drum 121.

The sheet P conveyed to the fixing unit 129 is nipped by a roller pair, while pressed and heated by the roller pair, so that the toner image is fixed on the sheet P through the melting and fixing of the toner. When the image data has been completely output, the sheet P with the fixed image is discharged, through a sheet discharge roller pair 40, to a sheet discharge tray 130 which projects toward the outside of the printer body 101A. In the case where an image is to be formed on the back side of the sheet P in duplex printing, the sheet P having passed through the fixing unit 129 is inverted by a sheet inversion unit 139, and then conveyed to the registration roller pair 136 by a duplex-printing conveyance unit 140. Then, the sheet P on which the image has been formed again by the image forming unit 119 is discharged to the sheet discharge tray 130.

Image Reading Apparatus

Figure 2:
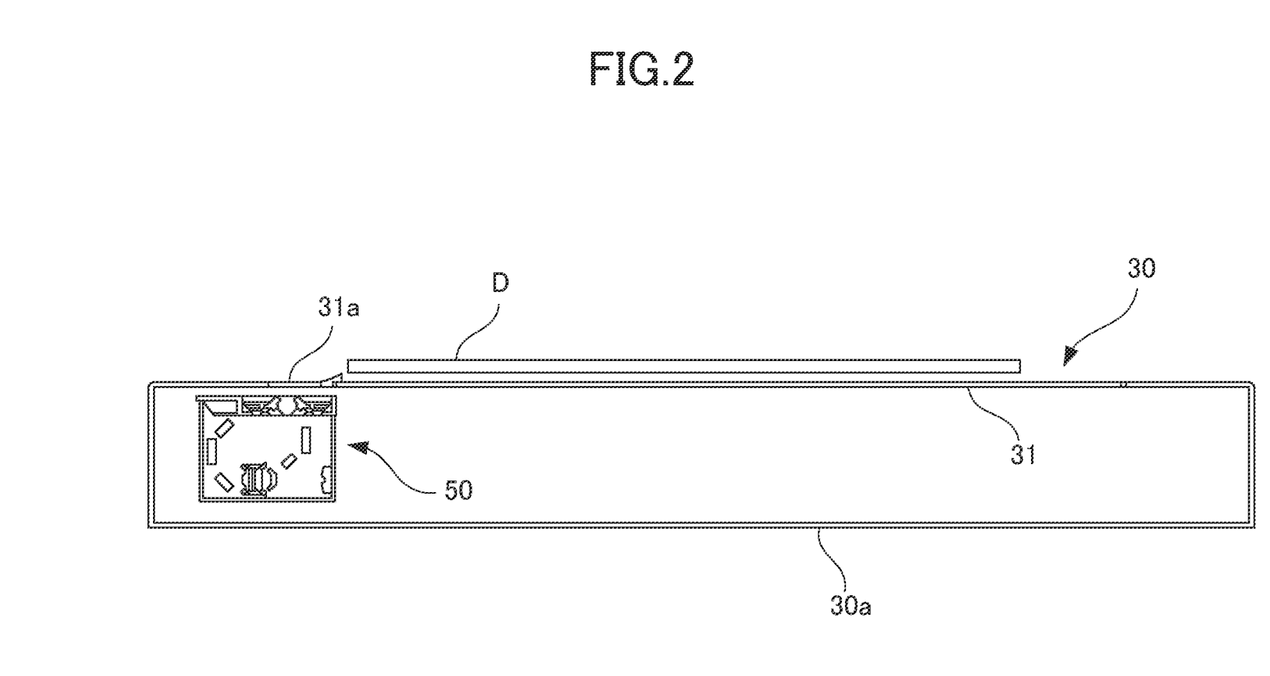
FIG. 2 is a cross-sectional view illustrating a reading unit.

Next, with reference to FIGS. 1, 2, and 3, a configuration of the image reading apparatus 103 will be described. As illustrated in FIG. 1, the ADF 1 conveys the document D placed on a document feeding tray 2 toward a document discharge tray 3. As illustrated in FIG. 2, the reading unit 30 has its exterior which is formed by a frame 30a, and a document glass 31 and a platen glass 31a are disposed on the top surface of the frame 30a. The frame 30a contains a scanner unit 50 in the interior, and the scanner unit 50 can move parallel to the document glass 31 with a wire or a belt, not shown, driven by a motor.

Figure 3:
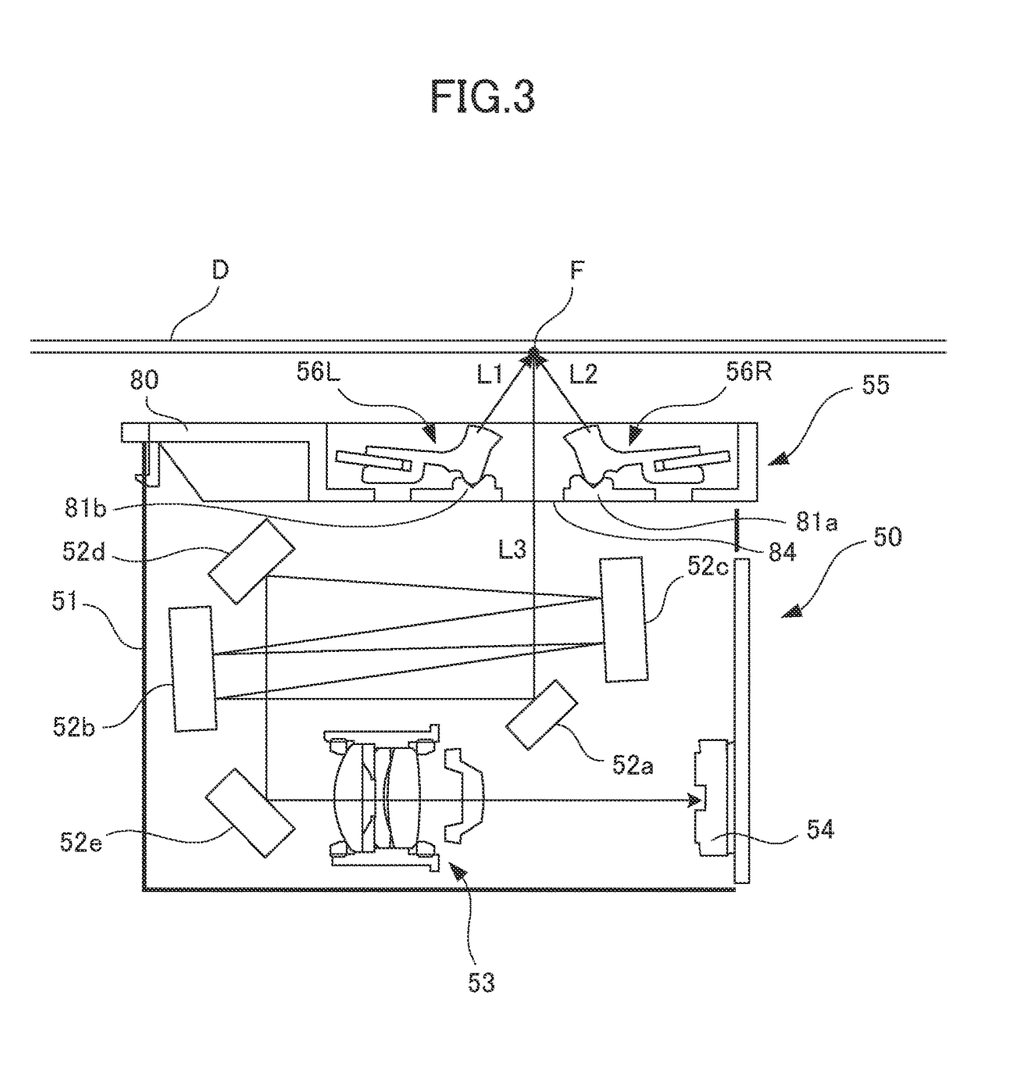
FIG. 3 is a cross-sectional view illustrating a scanner unit.

As illustrated in FIG. 3, the scanner unit 50 is a sensor unit using a charge coupled device (CCD). Specifically, the scanner unit 50 includes a box frame 51, an illumination unit 55 which is secured onto the top of the box frame 51, mirrors 52a, 52b, 52c, 52d, and 52e, a lens unit 53, and a CCD 54.

The illumination unit 55 includes two light guide units 56L and 56R. Light L1 and L2 respectively emitted from these light guide units 56L and 56R toward the document D are condensed onto a document illuminating position F set on an image reading surface which is a lower surface of the document D, and reflected. The reflected light L3 reflected at the document illuminating position F forms an image on the CCD 54 via the mirrors 52a, 52b, 52c, 52d, and 52e and the lens unit 53. The CCD 54, serving as an image reading unit, performs photoelectric conversion on the image formed by the reflected light L3, and outputs an electrical signal corresponding to an image of the image reading surface of the document D to the control unit 122.

The image reading apparatus 103 configured in this manner reads image information from the document D by using a feeding-reading mode or a fixed-reading mode. In the feeding-reading mode, the image of the document is scanned while the document D is being fed by the ADF 1. In the fixed-reading mode, the image of the document is scanned in a state where the document is placed on the document glass 31 serving as a transparent member. The feeding-reading mode is selected when the image reading apparatus detects the document D which is placed on the document feeding tray 2, or when the user selects the feeding-reading mode by using, for example, an operation panel or the like of the printer body 101A. In this case, in a state where the scanner unit 50 is positioned below the platen glass 31a, the ADF 1 feeds the document D having placed on the document feeding tray 2, one by one. Then, the scanner unit 50 illuminates the image reading surface of the document D through the platen glass 31a, and scans the image reading surface. That is, the scanner unit 50 reads the image of the document D having placed on the document glass 31, while the document D is being conveyed and scanned in a sub-scanning direction (right and left direction in FIG. 1).

On the other hand, the fixed-reading mode is selected when the image reading apparatus detects the document D having placed on the document glass 31, or when the user selects the fixed-reading mode by using, for example, the operation panel or the like of the printer body 101A. In a case of the fixed-reading mode, first, the user opens the ADF 1 and places the document D on the document glass 31, and then positions the document D on the document glass 31 by closing the ADF 1. Then, the scanner unit 50 illuminates the document reading surface of the document D having placed on the document glass 31, and scans the document D while moving along the document glass 31. Alternatively, a scanner unit for the feeding-reading mode and a scanner unit for the fixed-reading mode may be provided separate from each other. Further, the scanner unit 50 may be disposed in the interior of the ADF 1 so as to read the image on the back of the document in the feeding-reading mode.

Configuration of Illumination Unit

Figure 4:
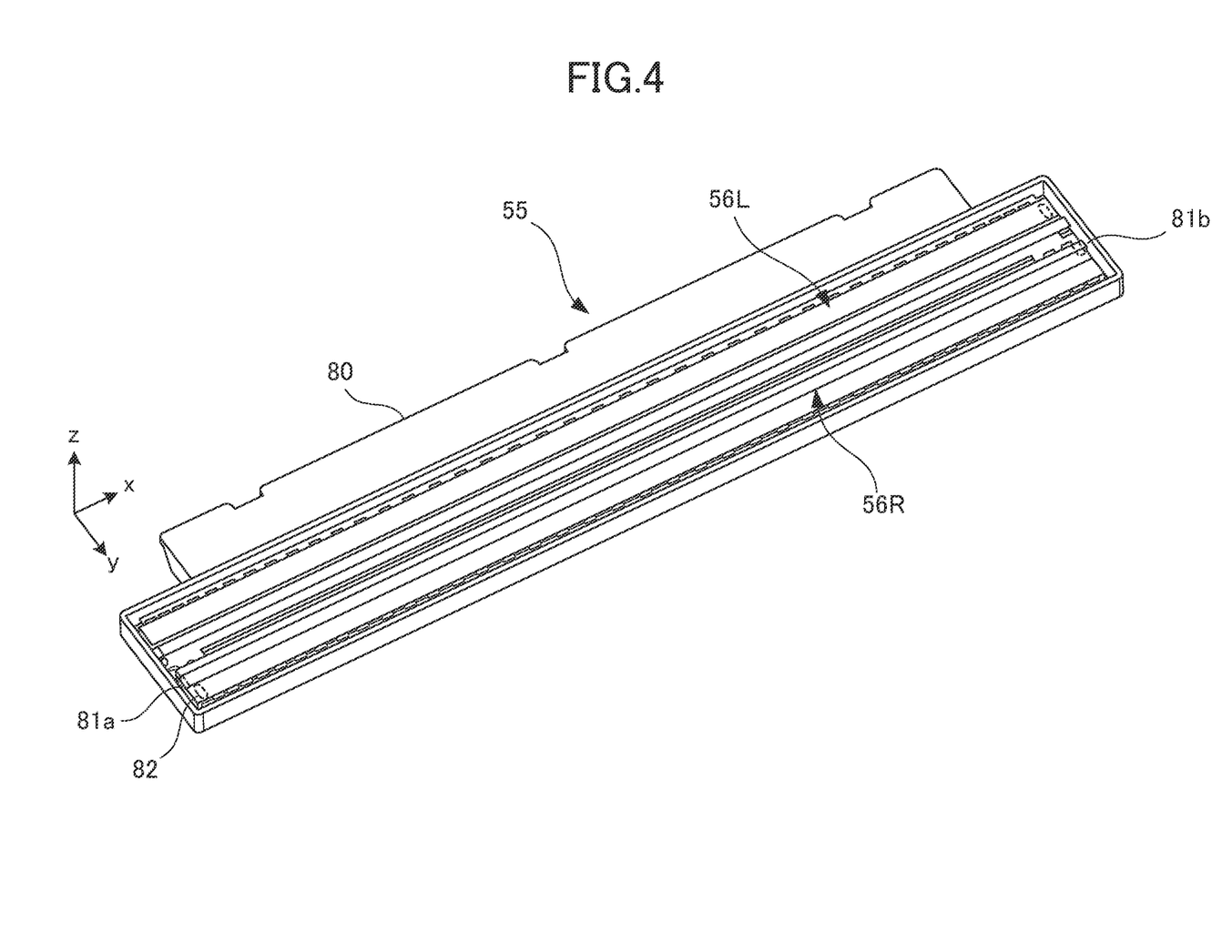
FIG. 4 is a perspective view illustrating an illumination unit.

As illustrated in FIG. 4, the illumination unit 55 includes the light guide units 56L and 56R and a base portion 80, serving as a support member to which these guide units 56L and 56R are secured. The light guide units 56L and 56R are the same in a configuration, and symmetrically disposed in the sub-scanning direction. Therefore, hereinafter, only the light guide unit 56R will be described, and descriptions of the light guide unit 56L will be omitted.

Figure 5A:
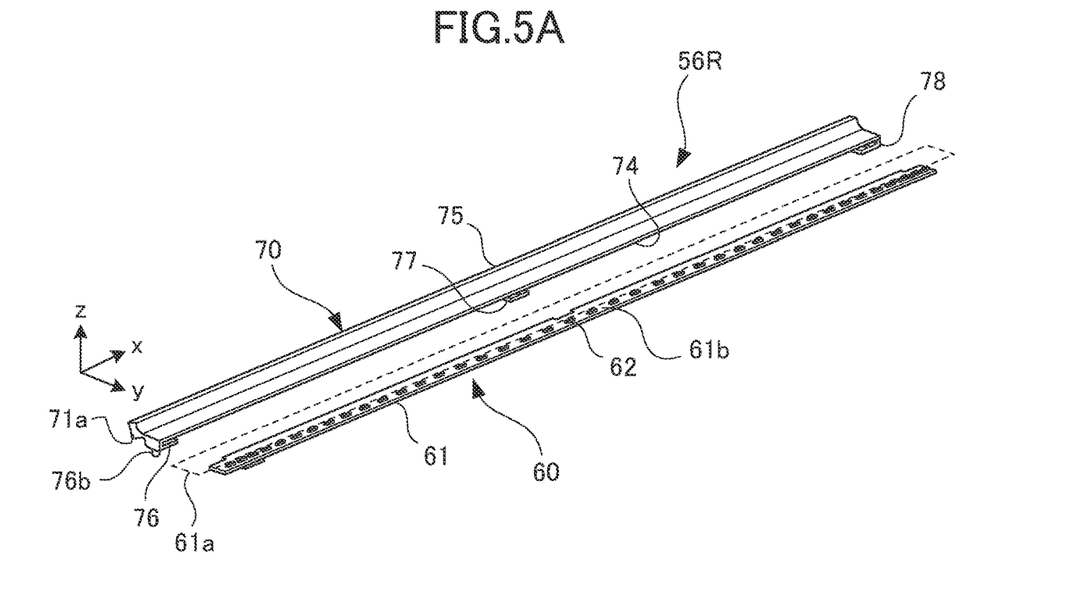
FIG. 5A is an exploded perspective view of a light guide unit viewed from above.
Figure 5B:
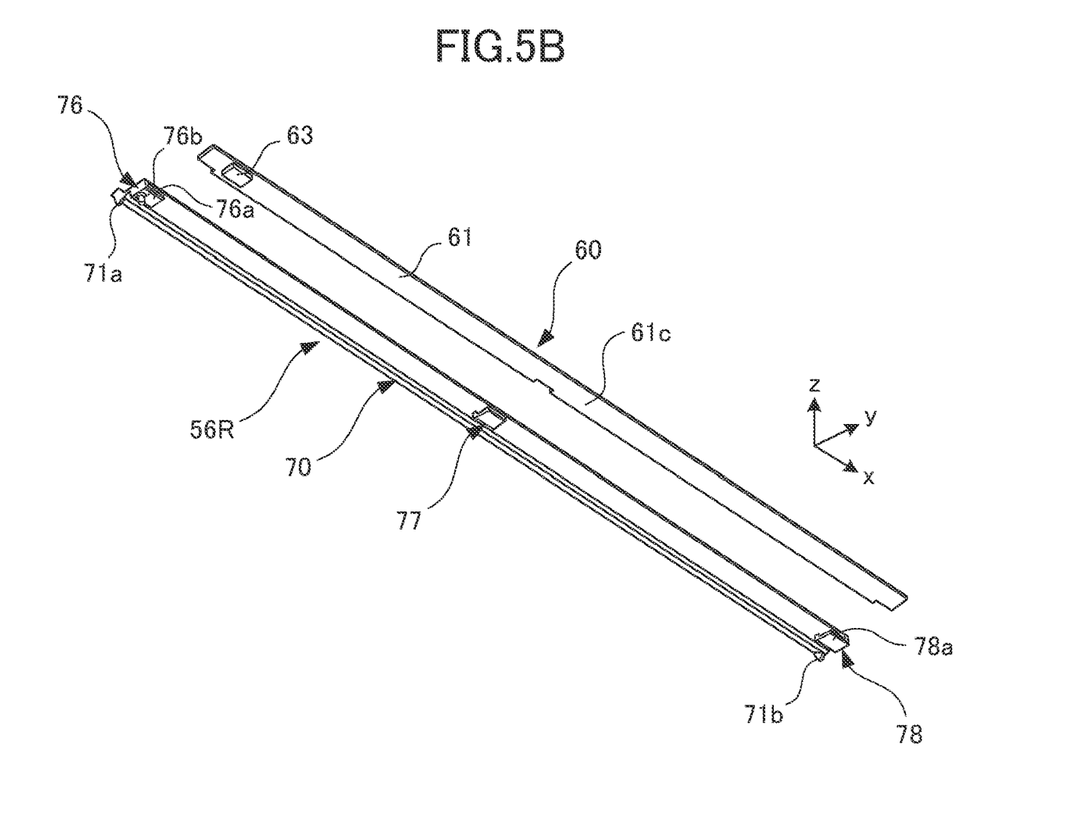
FIG. 5B is an exploded perspective view of the light guide unit viewed from below.

As illustrated in FIGS. 5A and 5B, the light guide unit 56R includes a light guide 70, serving as a light guide portion, and an LED board 60, serving as a circuit board. The LED board 60 includes a board portion 61, a plurality of LEDs 62, serving as a plurality of light sources mounted onto the board portion 61, and a connecter 63 electrically coupled to the plurality of T FDs 62. Here, the plurality of LEDs 62 are linearly mounted in a longitudinal direction of the board portion 61, and this mounting direction is the same as a main scanning direction orthogonally intersecting with the sub-scanning direction described above. Further, the plurality of T FDs 62 are supplied with electric power by electrical wiring, not shown, via the connecter 63. The inside of an area of dotted lines illustrated in FIG. 5A is an insertion portion 61a included in the board portion 61. Further, the board portion 61 includes a mounting surface 61b onto which the LED 62 is mounted, and a back surface 61c which is a surface opposite to the mounting surface 61b. The connecter 63 is secured to the back surface 61c of the board portion 61. Hereinafter, the sub-scanning direction which is a moving direction of the scanner unit 50, the main scanning direction, and an upper/lower direction orthogonally intersecting with these sub-scanning and main scanning direction are respectively referred to as a y, x, and z direction. To be noted, the x, y, and z direction are respectively a longitudinal direction of the LED board 60, a transverse direction of the LED board 60, and a thickness direction of the LED board 60, and these x, y, and z direction intersect with each other. Further, the z direction is a direction along the vertical direction.

The light guide 70 includes arc-shaped contact portions 71a and 71b which are formed at both ends in the x direction and come into contact with the base portion 80, slot portions 76, 77, and 78 which hold the LED board 60, and a positioning pin 76b which is inserted into the base portion 80. The slot portions 76, 77, and 78 are disposed at positions different from each other in the x direction. The slot portions 76 and 77 respectively serve as a first holding portion and a second holding portion, and each hold the LED board 60.

The positioning pin 76b extends downward from a lower surface 76a of the slot portion 76. Further, the light guide 70 includes an entrance surface 74 into which light emitted from the plurality of LEDs 62 enters, and an exit surface 75 from which the entered light is emitted toward the document illuminating position F of the document D. The entrance surface 74 extends continuously in the x direction. The light entered from the entrance surface 74 passes through the interior of the light guide 70, and is guided to the exit surface 75.

Figure 6:
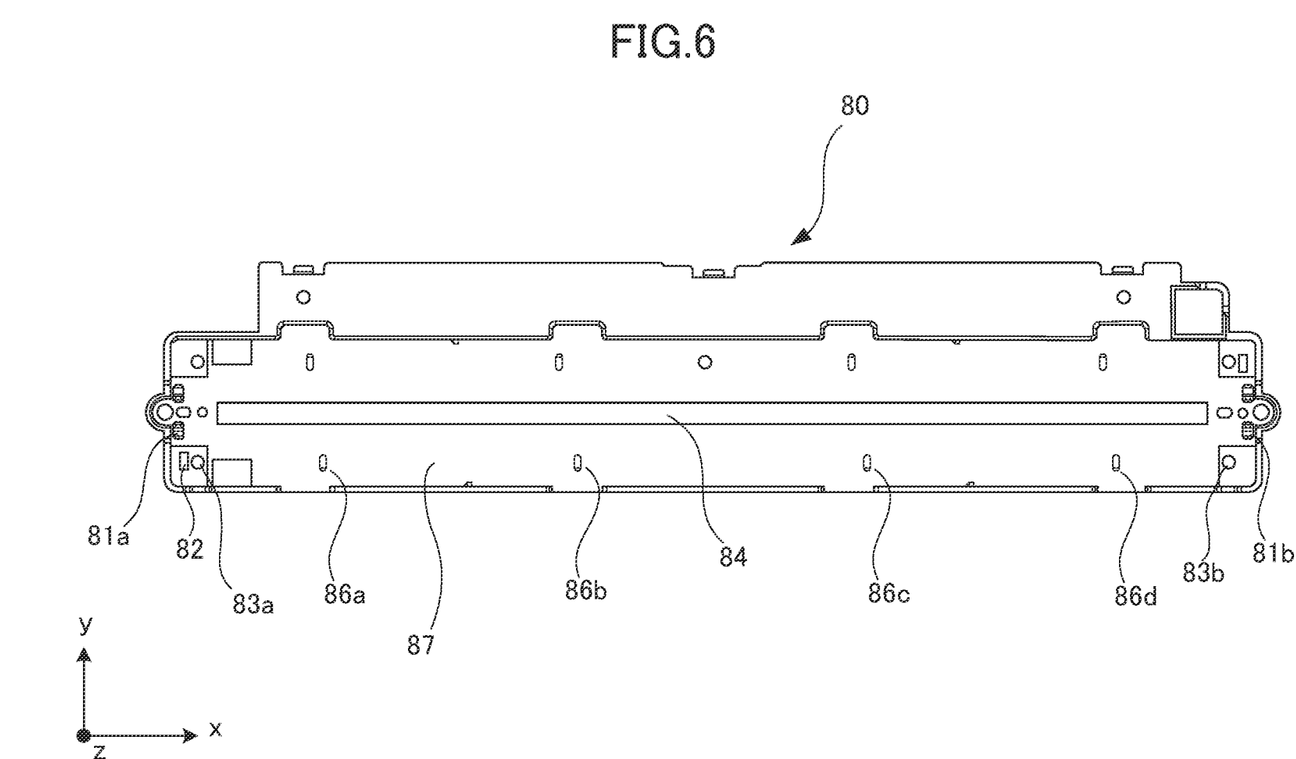
FIG. 6 is a plan view illustrating a base portion.

As illustrated in FIG. 6, the base portion 80 includes supporting portions 81a and 81b respectively supporting the contact portions 71a and 71b, and an elongated round hole 82 into which the positioning pin 76b is inserted. Further, the base portion 80 includes a bottom surface 87, serving as a surface extending along the x and y direction, and a plurality of projecting portions 86a, 86b, 86c, and 86d extending from the bottom surface 87 in the z direction, i.e., upward in the vertical direction, and holes 83a and 83b into which tool pins, not shown, are inserted. The bottom surface 87 faces the back surface 61c of the board portion 61. To be noted, another set of supporting portions, an elongated round hole, and projecting portions is formed in the base portion 80 so as to secure the light guide unit 56L. Further, an opening portion 84 for passing the reflected light L3 from the document D to the interior of the box frame 51 is disposed in the bottom surface 87 of the base portion 80. That is, the reflected light L3 passes through the opening portion 84.

Securing of LED Board to Light Guide Unit

Figure 7A:
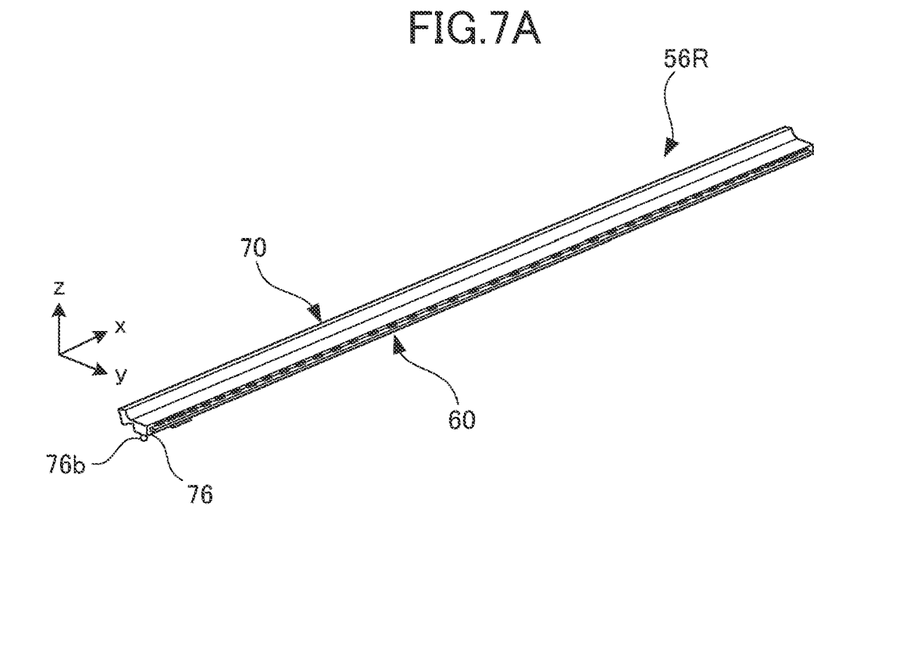
FIG. 7A is a perspective view of the light guide unit viewed from above.
Figure 7B:
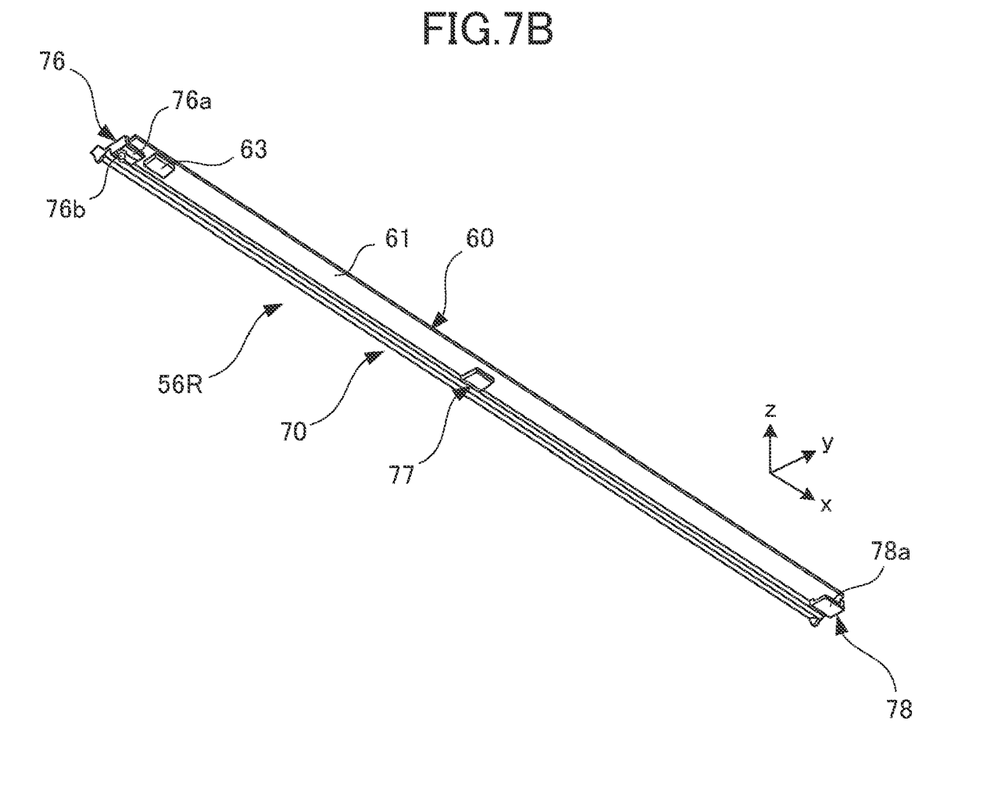
FIG. 7B is a perspective view of the light guide unit viewed from below.

As illustrated in FIGS. 7A and 7B, the LED board 60 is held by the light guide 70 by inserting the insertion portion 61a (refer to FIG. 5A) into the slot portions 76, 77, and 78 of the light guide 70.

Figure 8A:
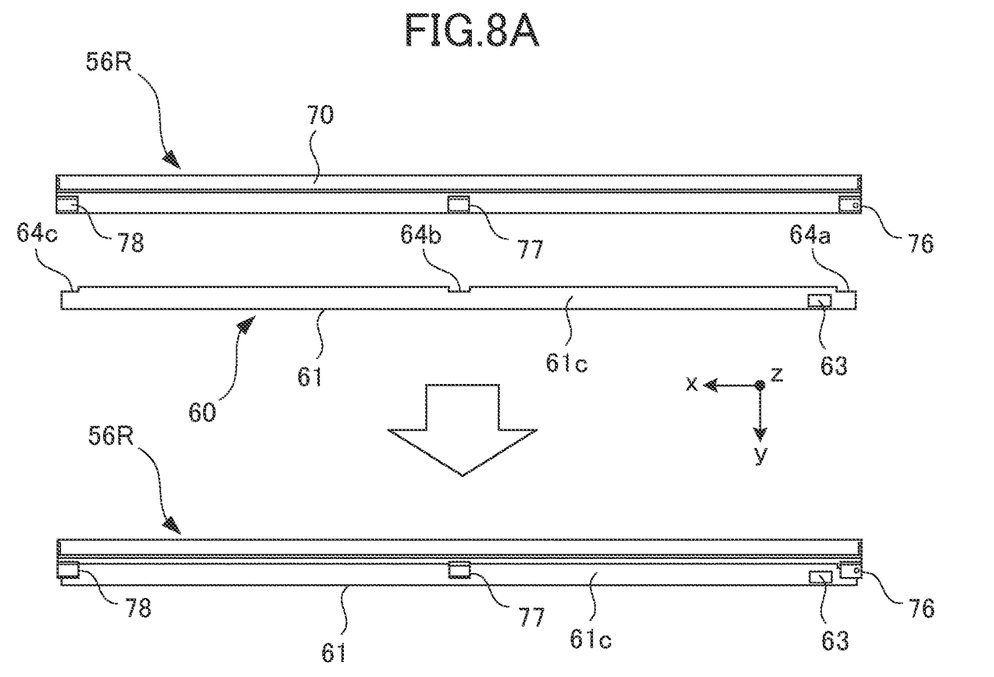
FIG. 8A is a bottom view illustrating a state in which an LED board is assembled to the light guide.

Here, as illustrated in FIG. 8A, notch portions 64a and 64c are formed at both ends in the x direction of the board portion 61, and a notch portion 64b is formed at the center in the x direction of the board portion 61. These notch portions 64a, 64b, and 64c are recessed with respect to the y direction. The notch portions 64a, 64b, and 64c are disposed at positions which respectively face the slot portions 76, 77, and 78. The notch portions 64a and 64b respectively includes a first recessed portion and a second recessed portion. That is, the notch portion 64a is disposed at a position corresponding to the slot portion 76, and the notch portion 64b is disposed at a position corresponding to the slot portion 77.

Then, when the insertion portion 61a of the LED board 60 is inserted into the slot portions 76, 77, and 78, the slot portion 77 is fitted (engaged) to the notch portion 64b in the x direction. By the fitting, a displacement of the LED board 60 with respect to the light guide 70 in the x direction (main scanning direction, longitudinal direction) is regulated. At this time, between the notch portion 64a and the slot portion 76 and between the notch portion 64c and the slot portion 78, sufficient intervals are disposed respectively so as not to cause these to interfere with each other in the x direction. By heat generation due to the lighting of the LED 62, and by the thermal expansion of members associated with a temperature change in the outside environment, a difference in the displacement in the x direction between the light guide 70 and the LED board 60 sometimes occurs because of a difference in a thermal expansion coefficient. However, by disposing the intervals described above, it is possible to prevent the occurrence of a bend and a distortion associated with tension between the light guide 70 and the LED board 60.

Figure 8B:
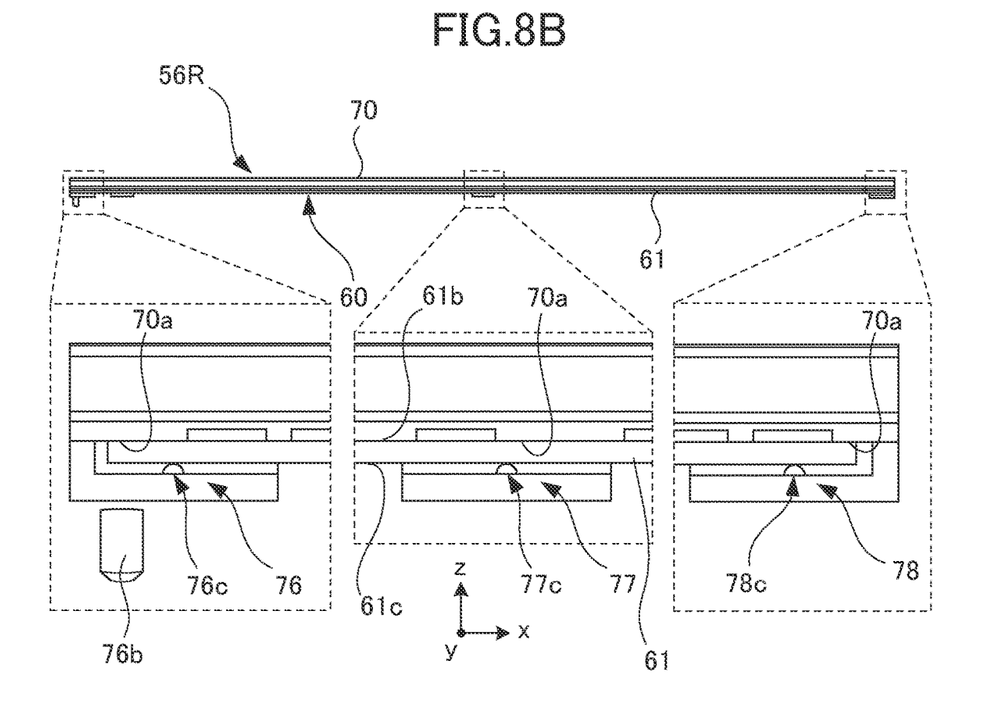
FIG. 8B is a front view and an enlarged front view illustrating a state in which the LED board has been pinched by slot portions.

Further, as illustrated in FIG. 8B, the insertion portion 61a is pinched by the slot portions 76, 77, and 78 and a facing surface 70a of the light guide 70 facing the bottom surface 87 (refer to FIG. 6) of the base portion 80 in the z direction. Specifically, the slot portions 76, 77, and 78 have a cross-sectional shape of substantially a rectangular shape with one side in they direction open, and ribs 76c, 77c, and 78c, each serving as a pinching portion, are respectively formed in the interiors of the slot portions 76, 77, and 78. The ribs 76c, 77c, and 78c come into contact with the back surface 61c of the board portion 61. The facing surface 70a comes into contact with the mounting surface 61b of the board portion 61. When the insertion portion 61a of the LED board 60 is inserted into gaps between the ribs 76c, 77c, and 78c and the facing surface 70a, the ribs 76c, 77c, and 78c deform elastically, and the insertion portion 61a is pinched with a predetermined pinching pressure by the facing surface 70a and the ribs 76c, 77c, and 78c. Thereby, a displacement of the LED board 60 in the z direction (vertical direction) with respect to the light guide 70 is regulated. Further, in a case where the LED board 60 originally has bends adjacent to the slot portions 76, 77, and 78, it is possible to correct the bends.

Securing Light Guide Unit to Base Portion

As illustrated in FIGS. 4 to 7B, at the time of securing the light guide unit 56R to the base portion 80, first, the worker causes the supporting portions 81a and 81b to support the contact portions 71a and 71b, and inserts the positioning pin 76b into the elongated round hole 82. Thereby, a displacement of the light guide unit 56R with respect to the base portion 80 in the x direction (main scanning direction) and the y direction (sub-scanning direction) is regulated.

Then, the worker inserts the tool pins, not shown, into the holes 83a and 83b of the base portion from below. Thereby, in a state where the contact portions 71a and 71b have come into contact with the supporting portions 81a and 81b of the base portion 80, the tool pins come into contact with the lower surfaces 76a and 78a of the slot portions 76 and 78. After positions of the tool pins have adjusted such that the lower surfaces 76a and 78a become substantially the same height, the worker secures the tool pins to the base portion 80. Thereby, a position of the light guide unit 56R in the z direction (vertical direction) is determined.

Configuration for Correcting LED Board

Figure 10:
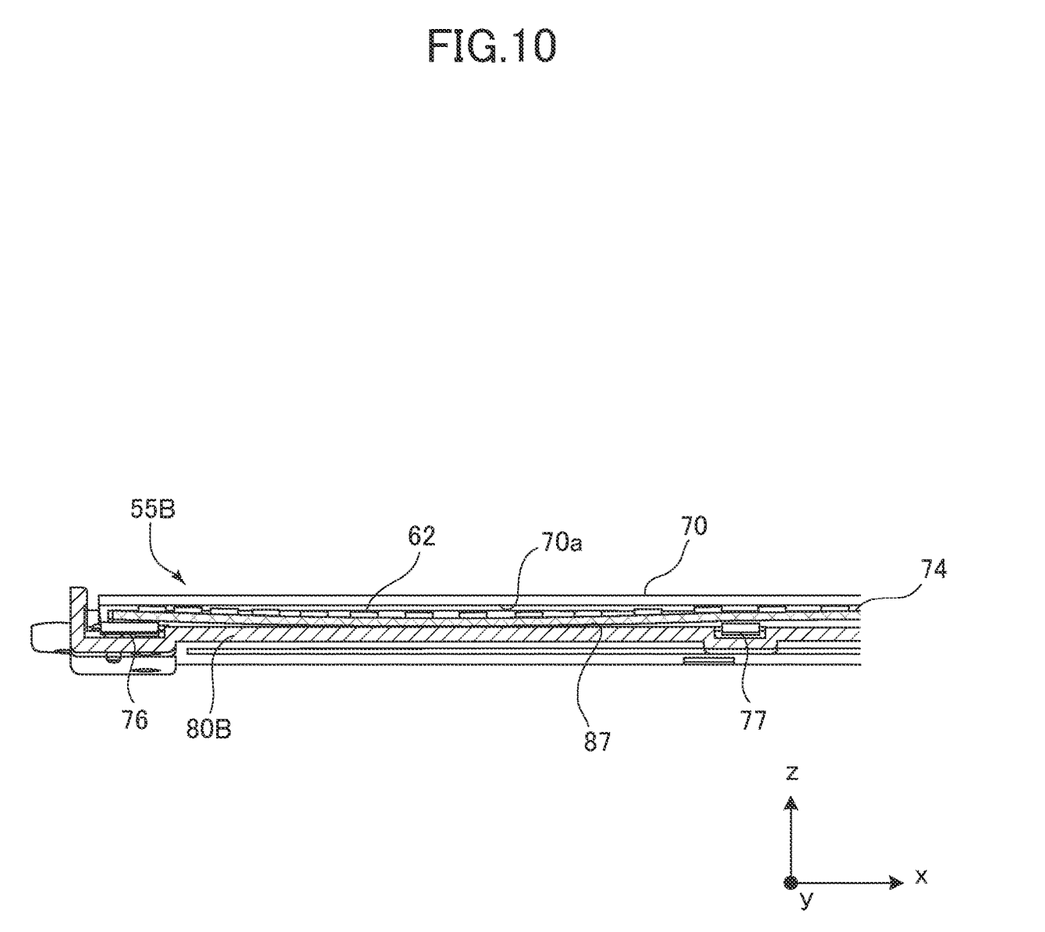
FIG. 10 is a cross-sectional view illustrating an illumination unit of a comparative example.

Regarding the LED board used in the illumination unit, in component manufacturing, it is common to produce a plurality of LED boards integrally and divide the plurality of LED boards one by one before mounting to the product. Then, a deformation such as a waviness and a bend of the LED board sometimes occurs at the time of dividing the LED board. FIG. 10 is a cross-sectional view illustrating an illumination unit 55B of a comparative example. The illumination unit 55B has the same configuration as the illumination unit 55 of this embodiment, except for a base portion 80B. As illustrated in FIG. 10, the projecting portions 86a, 86b, 86c, and 86d are not disposed in a bottom surface 87 of the base portion 80B of the illumination unit 55B. Therefore, in a case where the light guide 70 has the bends at positions other than the slot portions 76, 77, and 78, especially at positions among the slot portions 76, 77, and 78, there is the fear that the exit surface of the LED 62 of the LED board 60 deviates from the entrance surface 74 of the light guide 70 in the z direction. Since a light amount emitted from the light guide 70, thereby, does not become uniform in the x direction at the document illuminating position F of the document, there is the fear that it might not be possible to obtain a high quality read image having color stability.

For example, in a case where the LED board 60 deforms such that the LED 62 deviates upward from the entrance surface 74 in the z direction, a deformation of the LED board 60 is corrected by the facing surface 70a. On the other hand, as illustrated in FIG. 10, in a case where the LED board 60 deforms such that the LED 62 deviates downward from the entrance surface 74 in the z direction, the deformation of the LED board 60 is maintained within a range of a gap between the LED board 60 and the bottom surface 87. Therefore, as described above, the light amount emitted from the light guide 70 does not become uniform in the x direction at the document illuminating position F of the document.

Therefore, as illustrated in FIGS. 6 to 9A, the plurality of projecting portions 86a, 86b, 86c, and 86d are disposed in the bottom surface 87 of the base portion 80 in this embodiment. The projecting portions 86a and 86b, serving as a first projecting portion and a second projecting portion, are disposed between the slot portions 76 and 77 in the x direction. The projecting portions 86c and 86d are disposed between the slot portions 77 and 78 in the x direction. These projecting portions 86a, 86b, 86c, and 86d project upward in the z direction, i.e., toward the LED board 60, from the bottom surface 87 of the base portion 80, and face the LED board 60.

To be noted, while in this embodiment, two projecting portions are respectively disposed between the slot portions 76 and 77 and between the slot portions 77 and 78 in the x direction, it is not limited to this. For example, it is acceptable to respectively dispose one or equal to or more than three projecting portions between the slot portions 76 and 77 and between the slot portions 77 and 78. Further, it is acceptable that numbers of projecting portions disposed between the slot portions 76 and 77 and between the slot portions 77 and 78 are different from each other. Further, a shape and the size of a projecting portion are not limited, and, for example, it is acceptable to dispose a projecting portion which extends over the whole length between the slot portions 76 and 77 in the x direction.

Since the projecting portions 86a, 86b, 86c, and 86d are disposed in the bottom surface 87 of the base portion 80 in this embodiment, even if the LED board 60 deforms to bend downward in a state prior to being assembled to the light guide 70, it is possible to correct the deformation of the LED board 60. That is, it is possible to reduce a deformation amount of the LED board 60 in the gap between the LED board 60 and the bottom surface 87 of the base portion 80 by an amount corresponding to the height of the projecting portions 86a, 86b, 86c, and 86d. Therefore, the light amount emitted from the light guide 70 becomes uniform in the x direction at the document illuminating position F of the document, and it is possible to obtain a high quality read image having color stability.

Figure 9A:
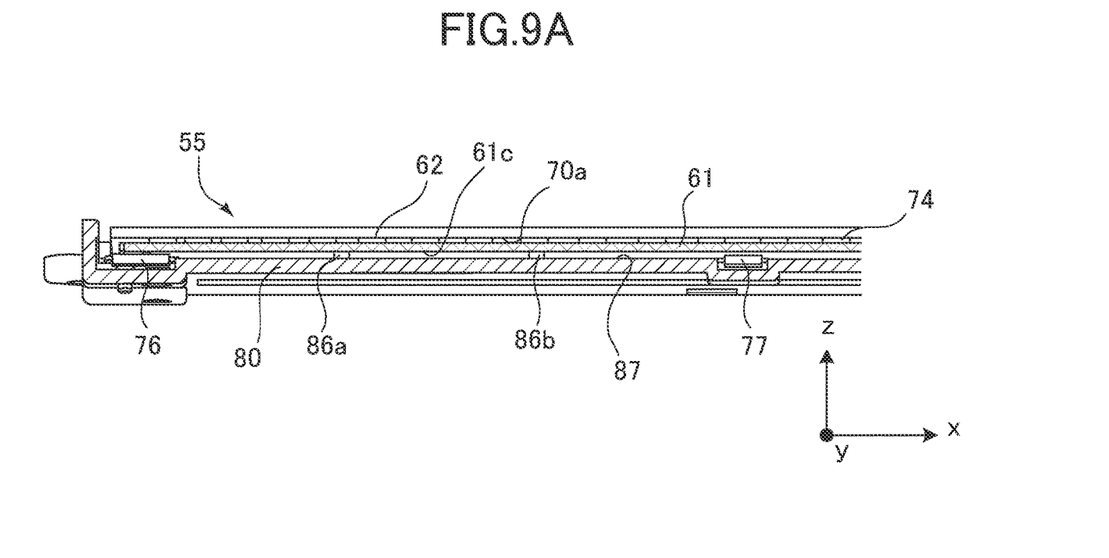
FIG. 9A is a cross-sectional view illustrating the illumination unit.
Figure 9B:
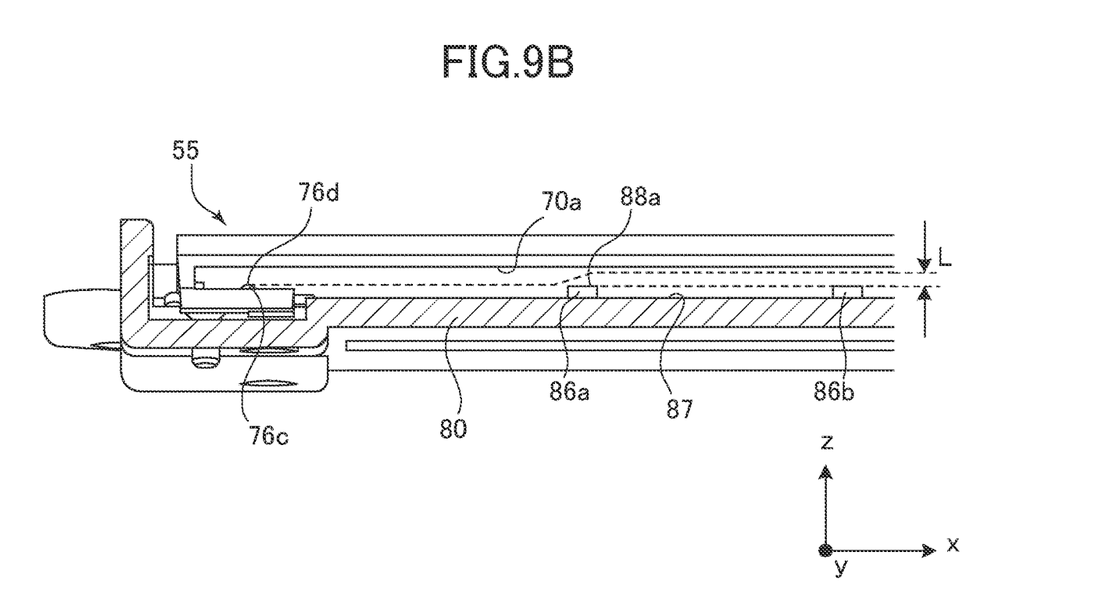
FIG. 9B is an enlarged cross-sectional view illustrating the illumination unit.

Further, in the z direction, ends of the projecting portions 86a, 86b, 86c, and 86d are positioned below ends of the ribs 76c, 77c, and 78c disposed on the slot portions 76, 77, and 78. In other words, the ends of the projecting portions 86a, 86b, 86c, and 86d are positioned at positions further from the LED board 60 in the z direction than the ends of the ribs 76c, 77c, and 78c disposed on the slot portions 76, 77, and 78. For example, as illustrated in FIG. 9B, an end 88a in the z direction of the projecting portion 86a, serving as the projecting portion, is disposed so as to be positioned below an end 76d of the rib 76c disposed on the slot portion 76 by a distance L in the z direction. In other words, the end 88a is positioned at a position further from the back surface 61c (refer to FIG. 9A) of the LED board 60 in the z direction (thickness direction) than the end 76d which is a contact portion of the rib 76 and LED board 60. That is, the end 88a is positioned at a position further from the facing surface 70a than the end 76d of the rib 76c.

Thereby, in a case where the LED board 60 is not deformed, it is possible to assemble the light guide 70 to the base portion 80 without coming into contact with the projecting portions 86a, 86b, 86c, and 86d. On the other hand, in a case where the LED board 60 is bent downward in the z direction more than the distance L, the ends of the projecting portions 86a, 86b, 86c, and 86d come into contact with the back surface 61c of the board portion 61. For example, the ends of the projecting portions 86a and 86b are configured to come into contact with the LED board 60 at positions between the slot portions 76 and 77. Thereby, it is possible to correct the deformation of the LED board 60 at the position between the slot portions 76 and 77.

In the configuration described above, since the LED board 60 is inserted until the plurality of LEDs 62 come into contact with the entrance surface 74, the LED board 60 is positioned with respect to the light guide 70. Then, in a state where the light guide unit 56R has been assembled to the base portion 80, the deformation such as the bend of the LED board 60 is corrected by the projecting portions 86a, 86b, 86c, and 86d disposed in the base portion 80. Therefore, it is possible to reduce the deviation of the exit surface of the LED 62 from the entrance surface 74 of the light guide 70 in the z direction due to the deformation of the LED board 60. Thereby, the light amount emitted from the light guide 70 becomes uniform in the x direction, and it is possible to obtain a high quality read image having color stability.

Further, for example, in a case where the deformation of the LED board 60 is corrected by increasing a number and the length of the slot portions disposed in the light guide 70 than this embodiment, a light amount leaking to the slot portions increases, and, consequently, the light amount emitted from the exit surface 75 of the light guide 70 is reduced. In this case, since it is necessary to increase a light amount output by T FDs which are applied to the LED board 60, negative effects such as cost increase due to increased specifications of the LED and an increase in heat generation might occur. In this embodiment, by disposing three slot portions 76, 77, and 78 in the light guide 70, the light amount leaking from the slot portions 76, 77, and 78 is reduced while securely holding the LED board 60. Further, it is possible to correct the deformation of the LED board 60 generated among the slot portions 76, 77, and 78 in the X direction by the facing surface 70a and the projecting portions 86a, 86b, 86c, and 86d. Therefore, while suppressing a reduction in the light amount emitted from the exit surface 75, it is possible to obtain a high quality read image having color stability.

Other Embodiments

To be noted, while three each of the slot portions 76, 77, and 78 and the notch portions 64a, 64b, and 64c are disposed in this embodiment, it is acceptable to dispose one to two or equal to or more than four. In such a case, it is desirable to dispose an at least one slot portion, which fits to the notch portion in the main scanning direction, at a position adjacent to the center in the main scanning direction.

Further, while the illumination unit 55 using the LED board 60 is described in this embodiment, it is not limited to this. For example, it is acceptable to apply this disclosure to illumination units including a board provided with light sources other than the LED.

Further, while, in this embodiment, the slot portions formed in the light guide have the rectangular shape with one side open, it is not limited to this. Further, while the projecting portions 86a, 86b, 86c, and 86d of this embodiment are disposed below the back surface 61c of the LED board 60, it is not limited to this. The illumination unit 55 including the base portion 80 and the light guide units 56R and 56L can be disposed in any posture, and it is acceptable to dispose, for example, the projecting portions 86a, 86b, 86c, and 86d above the back surface 61c of the LED board 60.

Further, the image reading apparatus 103 is not limited to apparatuses which include the ADF 1, and apparatuses which include only a pressure plate for pressing the document to the document glass 31 from above are acceptable.

Further, while the description has been made using the electrophotographic printer 101 in any of the embodiments described above, this disclosure is not limited to this. For example, this disclosure may also be applied to an ink-jet image forming apparatus that forms images on sheets by injecting ink from its nozzle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-002915, filed Jan. 12, 2022, which is hereby incorporated by reference herein in its entirety.

What is claimed is:
1. An image reading apparatus comprising:
a circuit board on which a plurality of light sources are disposed in a longitudinal direction;
a light guide portion configured to guide light emitted from the plurality of light sources, the light guide portion including a first holding portion configured to hold the circuit board, and a second holding portion configured to hold the circuit board, the second holding portion being disposed at a position different from the first holding portion in the longitudinal direction;
a support member configured to support the light guide portion; and
an image reading unit configured to read image information by performing photoelectric conversion on reflected light reflected by a sheet which has received light emitted from the light guide portion,
wherein the support member includes a projecting portion disposed between the first holding portion and the second holding portion in the longitudinal direction, the projecting portion facing and projecting toward the circuit board held by the first holding portion and the second holding portion.

2. The image reading apparatus according to claim 1, wherein the support member includes a surface extending along the longitudinal direction and a transverse direction, the transverse direction intersecting with a thickness direction of the circuit board and the longitudinal direction, and
wherein the projecting portion projects from the surface toward the circuit board in the thickness direction.

3. The image reading apparatus according to claim 2, wherein the circuit board includes a mounting surface onto which the plurality of light sources are mounted, and a back surface opposite to the mounting surface, and
wherein the surface of the support member faces the back surface.

4. The image reading apparatus according to claim 2, wherein the surface includes an opening portion through which the reflected light passes.

5. The image reading apparatus according to claim 2, wherein the light guide portion includes a facing surface which comes into contact with the circuit board and faces the surface in the thickness direction, wherein each of the first holding portion and the second holding portion includes a pinching portion configured to pinch the circuit board in the thickness direction with the facing surface, and
wherein an end, in the thickness direction, of the projecting portion is positioned at a position further from the circuit board in the thickness direction than a contact portion of the pinching portion and the circuit board.

6. The image reading apparatus according to claim 5, wherein the end of the projecting portion is configured such that the end of the projecting portion comes into contact with the circuit board at a position between the first holding portion and the second holding portion in the longitudinal direction.

7. The image reading apparatus according to claim 2, wherein the thickness direction is a direction along a vertical direction, and
wherein the projecting portion projects upward from the surface.

8. The image reading apparatus according to claim 2, wherein the circuit board includes a first recessed portion disposed at a position corresponding to the first holding portion, and a second recessed portion disposed at a position corresponding to the second holding portion,
wherein the first recessed portion and the second recessed portion are recessed in the transverse direction, and
wherein the first holding portion and the second holding portion are configured to regulate a displacement of the circuit board in the longitudinal direction by respectively engaging with the first recessed portion and the second recessed portion.

9. The image reading apparatus according to claim 1, wherein the projecting portion is a first projecting portion,
   wherein the support member includes a second projecting portion disposed between the first projecting portion and the second holding portion in the longitudinal direction, and
   wherein the second projecting portion faces and projects toward the circuit board held by the first holding portion and the second holding portion.

10. The image reading apparatus according to claim 1, wherein the light guide portion includes a facing surface configured to pinch the circuit board with the first holding portion and the second holding portion,
    wherein each of the first holding portion and the second holding portion includes a rib which comes into contact with and faces the circuit board, and
    wherein an end of the projecting portion is positioned at a position further from the facing surface than ends of the ribs.

11. The image reading apparatus according to claim 1, further comprising:
    a transparent member on which the sheet is placed; and
    a reading unit configured to move along the transparent member, the reading unit including a plurality of mirrors configured to reflect the reflected light from the sheet placed on the transparent member, a frame configured to hold the support member, the plurality of mirrors, and the image reading unit.

12. An image forming apparatus comprising:
    a circuit board on which a plurality of light sources are disposed in a longitudinal direction;
    a light guide portion configured to guide light emitted from the plurality of light sources, the light guide portion including a first holding portion configured to hold the circuit board, and a second holding portion configured to hold the circuit board, the second holding portion being disposed at a position different from the first holding portion in the longitudinal direction;
    a support member configured to support the light guide portion;
    an image reading unit configured to read image information by performing photoelectric conversion on reflected light reflected by a sheet which has received light emitted from the light guide portion; and
    an image forming unit configured to form an image on a sheet,
    wherein the support member includes a projecting portion disposed between the first holding portion and the second holding portion in the longitudinal direction, the projection portion facing and projecting toward the circuit board held by the first holding portion and the second holding portion.

\* \* \* \* \*